US012325029B1

(12) United States Patent
Wang et al.

(10) Patent No.: US 12,325,029 B1
(45) Date of Patent: Jun. 10, 2025

(54) ORGANIC SOLID WASTE TREATMENT EQUIPMENT AND APPLICATION METHOD THEREOF

(71) Applicant: Chengdu Environmental Investment Group Co., Ltd, Chengdu (CN)

(72) Inventors: Ying Wang, Chengdu (CN); Yi Rao, Chengdu (CN); Yulian Huang, Chengdu (CN); Chunjiang Yu, Chengdu (CN); Ming Gao, Chengdu (CN); Pengchen Wang, Chengdu (CN); Yue Han, Chengdu (CN); Shiyu Yang, Chengdu (CN)

(73) Assignee: Chengdu Environmental Investment Group Co., Ltd, Chengdu (CN)

( * ) Notice: Subject to any disclaimer, the term of this patent is extended or adjusted under 35 U.S.C. 154(b) by 0 days.

(21) Appl. No.: 18/946,964

(22) Filed: Nov. 14, 2024

(30) Foreign Application Priority Data

Jan. 16, 2024 (CN) ........................ 202410068559.1

(51) Int. Cl.
*B02C 18/00* (2006.01)
*B02C 18/06* (2006.01)
*B02C 23/02* (2006.01)
*B02C 23/08* (2006.01)

(52) U.S. Cl.
CPC ........ *B02C 18/0092* (2013.01); *B02C 18/067* (2013.01); *B02C 23/02* (2013.01); *B02C 23/08* (2013.01)

(58) Field of Classification Search
CPC ... B02C 18/0092; B02C 18/067; B02C 18/02; B02C 18/08; B02C 18/0084; B02C 18/06; B02C 18/22; B02C 18/2225; B02C 18/2233; B02C 18/2291; B30B 9/02; B30B 9/04; B30B 9/06; B30B 9/3039
USPC .............................................................. 241/3
See application file for complete search history.

(56) References Cited

U.S. PATENT DOCUMENTS

2023/0256454 A1 * 8/2023 Zhang .................... B02C 23/36 241/69

FOREIGN PATENT DOCUMENTS

| | | | | |
|---|---|---|---|---|
| CN | 104923361 | A | * | 9/2015 |
| CN | 108144701 | A | * | 6/2018 |
| CN | 112354622 | A | * | 2/2021 |
| CN | 213434827 | U | * | 6/2021 |
| CN | 116873991 | A | * | 10/2023 |
| CN | 117245967 | A | * | 12/2023 |
| KR | 200222008 | Y1 | * | 5/2001 |

(Continued)

*Primary Examiner* — Christopher L Templeton
*Assistant Examiner* — P Derek Pressley

(57) ABSTRACT

Organic solid waste treatment equipment of the technical field of organic solid waste treatment is provided, including a box body, the top of the box body is fixedly connected with a feeding port. When in use, waste is poured into the box from the feeding port, driven by the extended hydraulic rod to move the squeezing plate, pushing the waste towards the drainage groove; the waste is pushed to the filter screen surface by the squeezing plate, squeezed and drained by its pressure, and repeatedly squeezed by the hydraulic rod's extension and retraction to dry, and waste is crushed in the barrel, slides down the plates into the hopper, and then into the conveying pipe. By activating the third motor, the auger flights are driven to rotate, pushing the waste out from the end face of the conveying pipe to complete the discharging.

2 Claims, 8 Drawing Sheets

(56) References Cited

FOREIGN PATENT DOCUMENTS

KR 20140052749 A * 5/2014

* cited by examiner

ORGANIC SOLID WASTE TREATMENT EQUIPMENT AND APPLICATION METHOD THEREOF

TECHNICAL FIELD

The disclosure relates to a technical field of organic solid waste treatment, and in particular to organic solid waste treatment equipment and an application method thereof.

BACKGROUND

Organic solid waste encompasses biomass, food waste, agricultural byproducts, wood, paper, and other materials rich in organic content. Managing organic solid waste is a critical task in the realm of environmental protection.

In conventional methods, organic solid wastes are typically shredded before being fed into an incinerator for disposal. However, the high moisture content in some of these wastes can lead to excessive smoke production upon incineration, which not only hampers combustion efficiency but also diminishes the overall effectiveness of the waste treatment process.

Therefore, organic solid waste treatment equipment and an application method is provided in order to solve the above problems.

SUMMARY

The present disclosure provides organic solid waste treatment equipment and an application method thereof, addressing the issue raised in the background regarding the generation of a large amount of smoke and the impact on combustion efficiency when waste containing moisture is incinerated, which consequently leads to lower efficiency in waste treatment.

In order to achieve the above purpose, the disclosure provides the following technical scheme: organic solid waste treatment equipment, includes a box body, where the top of the box body is fixedly connected with a feeding port, the outer surface of one side of the box body is fixedly connected with a hydraulic rod, the output end of the hydraulic rod slides through the box body and extends to the inside, the outer surface of the other side of the box body is provided with a drainage groove, the inner surface of the drainage groove is fixedly connected with a clamping frame, and the outer surface of the clamping frame is provided with a filter screen; a squeezing assembly, where the squeezing assembly is fixedly connected with the output end of the hydraulic rod, and includes an squeezing plate; a discharging assembly, where the discharging assembly is fixedly connected to the inner surface of the box body, and includes a bracket and a fixing frame; a crushing assembly, where the crushing assembly is fixedly connected to the bottom of the box body, and includes a crushing barrel, the outer surface of the crushing barrel is fixedly connected with a support ring, and the bottom of the support ring is uniformly and fixedly connected with a plurality of support legs; and a feeding assembly, where the feeding assembly is fixedly connected to the bottom of the crushing barrel, and includes a receiving hopper, and a conveying pipe fixedly connected at the bottom of the receiving hopper.

Optionally, the squeezing plate is matched with the drainage groove, the bottom of the squeezing plate is provided with a notch, the inner bottom of the notch is fixedly connected with a plurality of first telescopic rods at equal intervals, the outer surfaces of the first telescopic rods are sleeved with first springs, and the bottoms of the first telescopic rods are fixedly connected with an insert block, and the bottom of the insert block is fixedly connected with a scraper, the bottom of the scraper is attached to the top of the bracket, and the outer surface of the insert block is slidably connected with the inner surface of the notch.

Optionally, the fixing frame is located at the lower side of the bracket, the inner surface of the bracket is fixedly connected with an electric push rod, the end surface of the electric push rod is fixedly connected with a baffle plate, the electric push rod is in an extended state, and the outer surfaces of the bracket and the baffle plate are attached to the inner surface of the box body.

Optionally, the top of the fixing frame is uniformly and fixedly connected with a plurality of second springs, and a discharging guide plate is fixedly connected between the upper end surfaces of the plurality of the second springs, and the discharging guide plate is matched with the position of the baffle plate.

Optionally, the outer surface of the fixing frame is fixedly connected with a first motor, the output end of the first motor slides through the fixing frame and extends to the inner side, the output end of the first motor is fixedly connected with a first rotating shaft, the outer surface of the first rotating shaft is symmetrically and fixedly connected with an eccentric wheel, and the outer surface of the eccentric wheel is attached to the bottom of the discharging guide plate.

Optionally, the inner surfaces of both sides of the drainage groove are provided with mounting grooves, the inner bottoms of the mounting grooves are symmetrically and fixedly connected with second telescopic rods, the outer surface of the second telescopic rods is sleeved with a third spring, a clamping block is fixedly connected between the end surfaces of two second telescopic rods, the outer surface of the filter screen is attached to the inner surface of the drainage groove, the filter screen is located between the clamping frame and the clamping block, the outer surface of the clamping block is arranged in an inclined plane, and a drainage guide plate is fixedly connected to the outer surface of the box body near the lower side of the drainage groove.

Optionally, the inner surface of the crushing barrel is symmetrically and fixedly connected with first fixing rods near the lower end surface, and a mounting plate is fixedly connected between the end surfaces of two first fixing rods; the bottom of the mounting plates is fixedly connected with a second motor; the output end of the second motor slides through the mounting plates and extends to the upper side; the output end of the second motor is fixedly connected with a second rotating shaft, and the outer surface of the second rotating shaft is uniformly and fixedly connected with a plurality of blades.

Optionally, the inner surface of the crushing barrel is symmetrically and fixedly connected with second fixing rods near the upper end surface, a bearing is fixedly connected between the end surfaces of two second fixing rods, the inner surface of the bearing is rotatably connected with the outer surface of the second rotating shaft, and the inner surface of the crushing barrel is symmetrically and fixedly connected with inclined plates near the lower side of the mounting plate.

Optionally, the inclined plates are matched with the receiving hopper, the outer surface of the conveying pipe is fixedly connected with a third motor, the output end of the third motor slides through the conveying pipe and extends to the inner side, the output end of the third motor is fixedly connected with a third rotating shaft, the outer surface of the third rotating shaft is fixedly connected with auger flights, and the outer surface of the auger flights is attached to the inner surface of the conveying pipe.

An application method of the organic solid waste treatment equipment includes the following steps:

S1, when processing organic solid waste, pouring the waste into the box body from the feeding port, extending the hydraulic rod, driving the squeezing plate to move, and pushing the waste towards the drainage groove; pushing the waste towards the filter screen by the squeezing plate, applying pressure through the squeezing plate to squeeze and drain the waste, allowing the squeezed-out water to flow out along the drainage guide plate, and repeatedly squeezing the waste by moving the squeezing plate through the extension and retraction of the hydraulic rod to dry the waste;

S2, completing the squeezing, retracting the electric push rod to remove the baffle plate 503, creating a gap at the position of the bracket after the baffle plate is removed, allowing the squeezed waste to fall out from the gap where the baffle plate has been moved away, dropping the waste from the gap position onto the discharging guide plate, and sliding the waste down the inclined surfaces of the discharging guide plate for discharging;

S3, when the waste is discharged through the discharging guide plate, initiating the first motor to drive the eccentric wheel into rotation, rotating the eccentric wheel to repeatedly strike the bottom of the discharging guide plate, causing the discharging guide plate to generate continuous vibrations, using the vibrations of the discharging guide plate to disperse the compacted waste into smaller pieces, facilitating the crushing process of the waste; and S4, waste passing through the discharging guide plate and falling into the crushing barrel, activating the second motor to drive the blades to rotate, rotating the blades to crush the falling waste, allowing the crushed waste to slide down the inclined plates and into the receiving hopper, then into the conveying pipe; activating the third motor to drive the auger flights to rotate, rotating the auger flights to push the waste out from the end face of the conveying pipe, and completing the discharging.

Compared with the prior art, the disclosure has following beneficial effects.

First, when in use, the waste is poured into the box body from the feeding port, the hydraulic rod is extended to drive the squeezing plate to move, and the waste is pushed towards the drainage groove; when the waste is pushed to the surface of the filter screen 10 by the squeezing plate, the waste is squeezed and drained by the pressure exerted by the squeezing plate, and the waste is repeatedly squeezed by moving the squeezing plate through the extension and retraction of the hydraulic rod to dry the waste, and waste can be crushed after passing through the crushing barrel. The crushed waste slides down the inclined plates and into the receiving hopper, then into the conveying pipe. By activating the third motor, the auger flights are driven to rotate, pushing the waste out from the end face of the conveying pipe to complete the discharge. This achieves the purpose of automating the treatment of waste, including dewatering and crushing.

Second, when in use, as the squeezing plate moves, the resiliency provided by the first telescopic rods and the first springs drives the insert block and the scraper to closely adhere to the surface of the bracket. The scraper can remove contaminants adhering to the surface of the bracket, preventing waste from sticking to the interior of the box body and causing pollution.

Third, when the waste is discharged through the discharging guide plate, the first motor is initiated to drive the eccentric wheel into rotation. The eccentric wheel rotates and repeatedly hits the bottom of the discharging guide plate, so that the discharging guide plate generates continuous vibration. The vibrations of the discharging guide plate are used to disperse the compacted waste into smaller pieces, facilitating the crushing process of the waste, preventing large pieces of waste from jamming or damaging the blades.

Forth, when in use, the clamping block on the inside of the mounting grooves is pressed, allowing the filter screen to be directly removed once the clamping block is moved. After the cleaning is completed, the filter screen is pressed directly into the drainage groove. After the filter screen comes into contact with the inclined surface of the clamping block, the clamping block is pressed into the mounting grooves. Then, the resilience of the third spring is utilized to drive the clamping block to pop out, the filter screen is clamped between the clamping frame and the clamping block, and the installation is completed. This makes the operation of installing and uninstalling the filter screen relatively convenient and quick.

Figure 1:
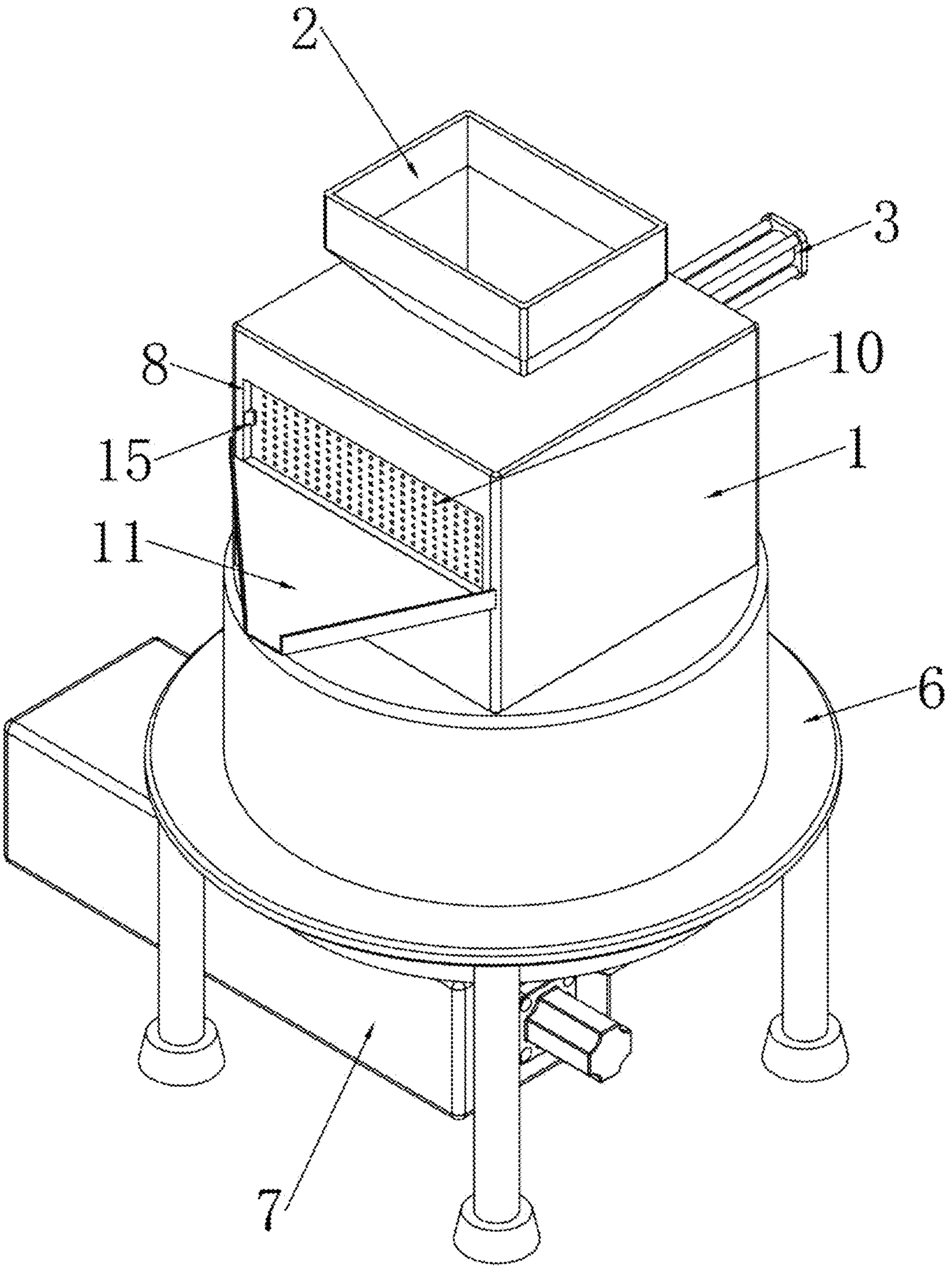
FIG. 1 is a perspective view of organic solid waste treatment equipment according to the present disclosure.
Figure 2:
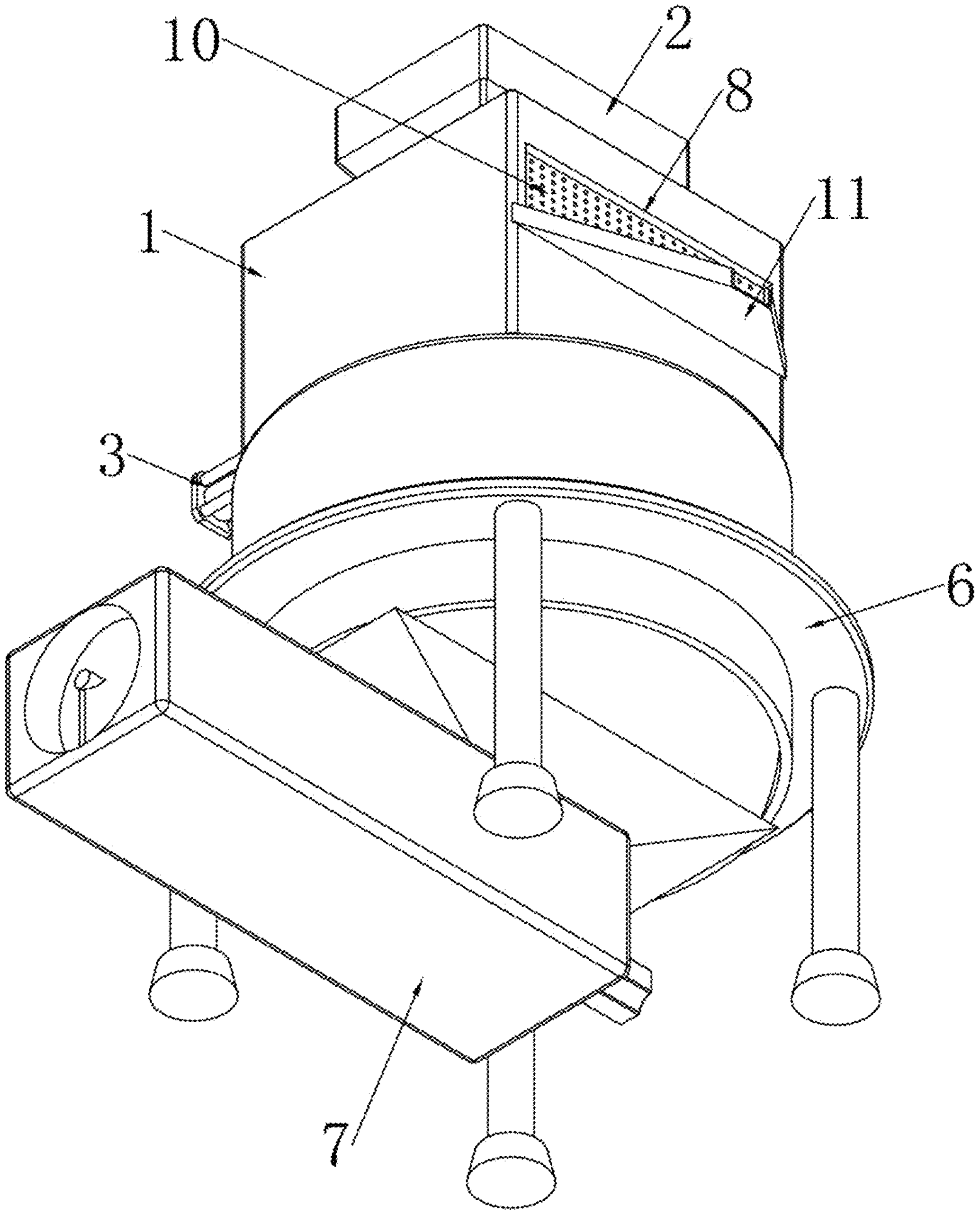
FIG. 2 is a bottom view of the organic solid waste treatment equipment according to the present disclosure.

1. box body; 2. feeding port; 3. hydraulic rod; 4. squeezing assembly; 401. squeezing plate; 402. notch; 403. first telescopic rod; 404. first spring; 405. insert block; 406. scraper; 5. discharging assembly; 501. bracket; 502. electric push rod; 503. baffle plate; 504. fixing frame; 505. second spring; 506. discharging guide plate; 507. first motor; 508. first rotating shaft; 509. eccentric wheel; 6. crushing assembly; 601. crushing barrel; 602. support ring; 603. support leg; 604. mounting plate; 605. first fixing rod; 606. second motor; 607. second rotating shaft; 608. blade; 609. bearing; 610. second fixing rod; 611. inclined plate; 7. feeding assembly; 701. conveying pipe; 702. receiving hopper; 703. third motor; 704. third rotating shaft; 705. auger flight; 8. drainage groove; 9. clamping frame; 10. filter screen; 11.

drainage guide plate; 12. mounting groove; 13. second telescopic rod; 14. third spring; and 15. clamping block.

DETAILED DESCRIPTION OF THE EMBODIMENTS

In the following, the technical scheme in the embodiment of the disclosure will be described clearly and thoroughly with the attached drawings. Obviously, the described implementation regulations are only a part of the embodiment of the disclosure, but not the whole embodiment. Based on the embodiments in the present disclosure, all other embodiments obtained by ordinary technicians in the field without creative work belong to the scope of protection of the present disclosure.

Referring to FIGS. 1-8, organic solid waste treatment equipment includes includes a box body 1, where the top of the box body 1 is fixedly connected with a feeding port 2, the outer surface of one side of the box body 1 is fixedly connected with a hydraulic rod 3, the output end of the hydraulic rod 3 slides through the box body 1 and extends to the inside, the outer surface of the other side of the box body 1 is provided with a drainage groove 8, the inner surface of the drainage groove 8 is fixedly connected with a clamping frame 9, and the outer surface of the clamping frame 9 is provided with a filter screen 10; a squeezing assembly 4, where the squeezing assembly 4 is fixedly connected with the output end of the hydraulic rod 3, and includes an squeezing plate 401; a discharging assembly 5, where the discharging assembly 5 is fixedly connected to the inner surface of the box body 1, and includes a bracket 501 and a fixing frame 504; a crushing assembly 6, where the crushing assembly 6 is fixedly connected to the bottom of the box body 1, and includes a crushing barrel 601, the outer surface of the crushing barrel 601 is fixedly connected with a support ring 602, and the bottom of the support ring 602 is uniformly and fixedly connected with a plurality of support legs 603; and a feeding assembly 7, where the feeding assembly 7 is fixedly connected to the bottom of the crushing barrel 601, and includes a receiving hopper 702, and a conveying pipe 701 fixedly connected at the bottom of the receiving hopper 702.

Figure 3:
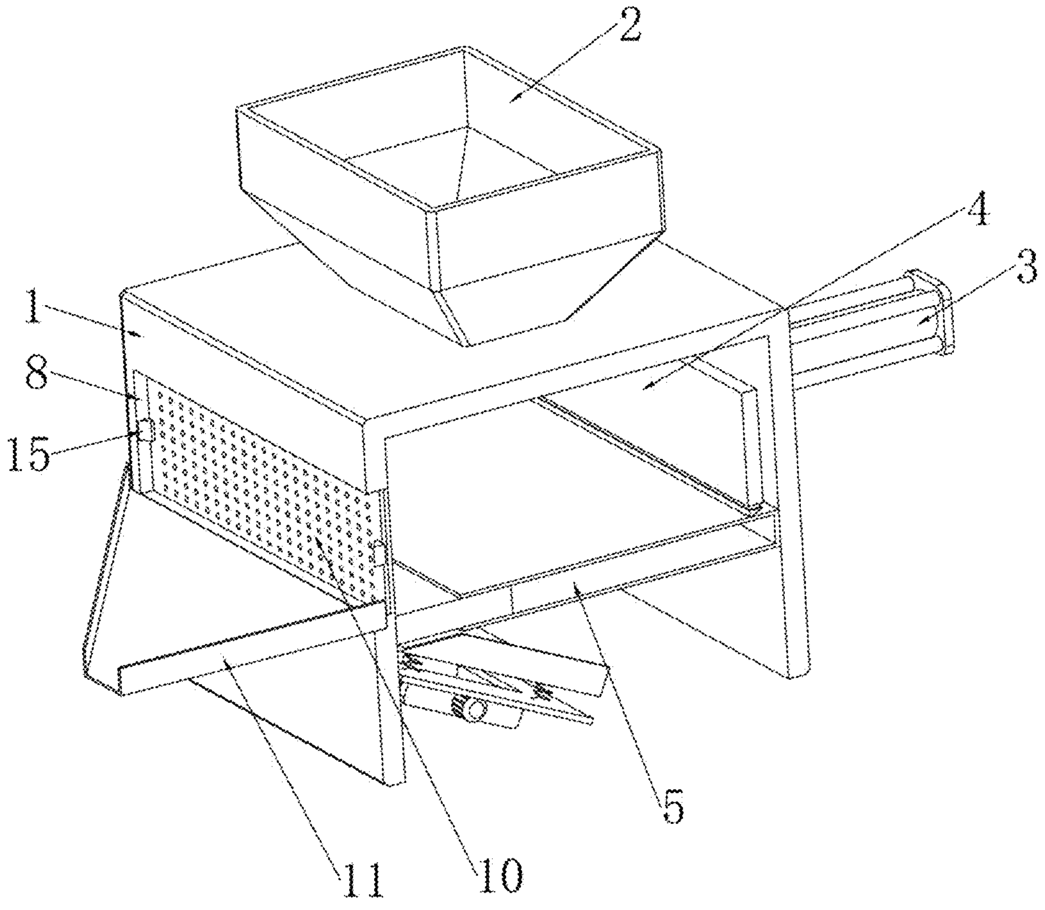
FIG. 3 is a structural section view of a box body of the organic solid waste treatment equipment according to the present disclosure.
Figure 4:
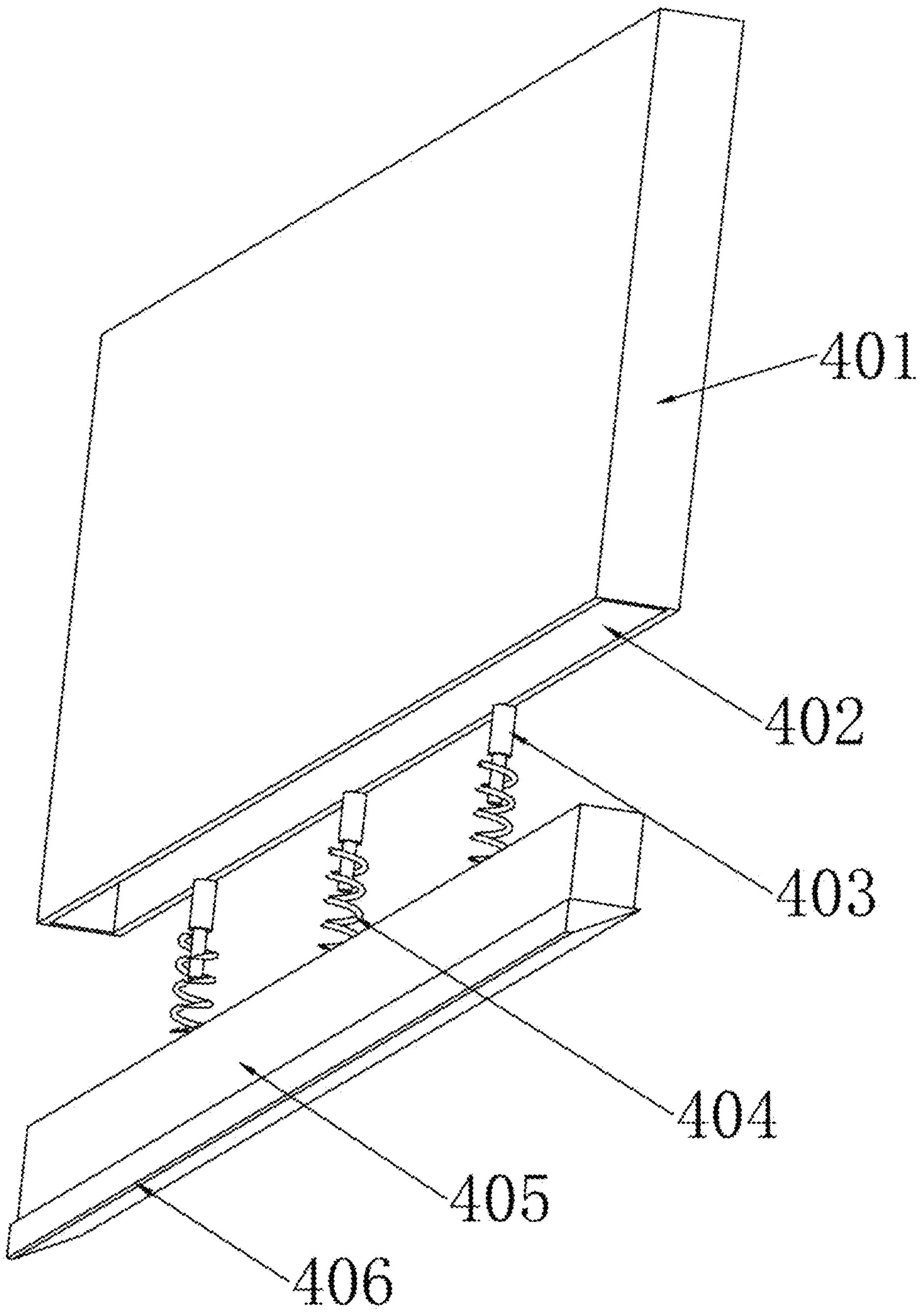
FIG. 4 is a structural schematic diagram of a squeezing assembly of the organic solid waste treatment equipment according to the present disclosure.

As shown in FIG. 3 and FIG. 4, the squeezing plate 401 is matched with the drainage groove 8, the bottom of the squeezing plate 401 is provided with a notch 402, the inner bottom of the notch 402 is fixedly connected with a plurality of first telescopic rods 403 at equal intervals, the outer surfaces of the first telescopic rods 403 are sleeved with first springs 404, and the bottoms of the first telescopic rods 403 are fixedly connected with an insert block 405, and the bottom of the insert block 405 is fixedly connected with a scraper 406, the bottom of the scraper 406 is attached to the top of the bracket 501, and the outer surface of the insert block 405 is slidably connected with the inner surface of the notch 402. Waste is put in from the position of the feeding port 2, and the waste is piled up above the bracket 501 and the baffle plate 503 after entering, the hydraulic rod 3 is extended to drive the squeezing plate 401 to move, and the waste is pushed towards the drainage groove 8; when the waste is pushed to the surface of the filter screen 10 by the squeezing plate 401, the waste is squeezed and drained by the pressure exerted by the squeezing plate 401; as the squeezing plate 401 moves, the resiliency provided by the first telescopic rods and the first springs drives the insert block 405 and the scraper 406 to closely adhere to the surface of the bracket 501. The scraper 406 can remove contaminants adhering to the surface of the bracket 501, preventing waste from sticking to the interior of the box body 1 and causing pollution.

Figure 5:
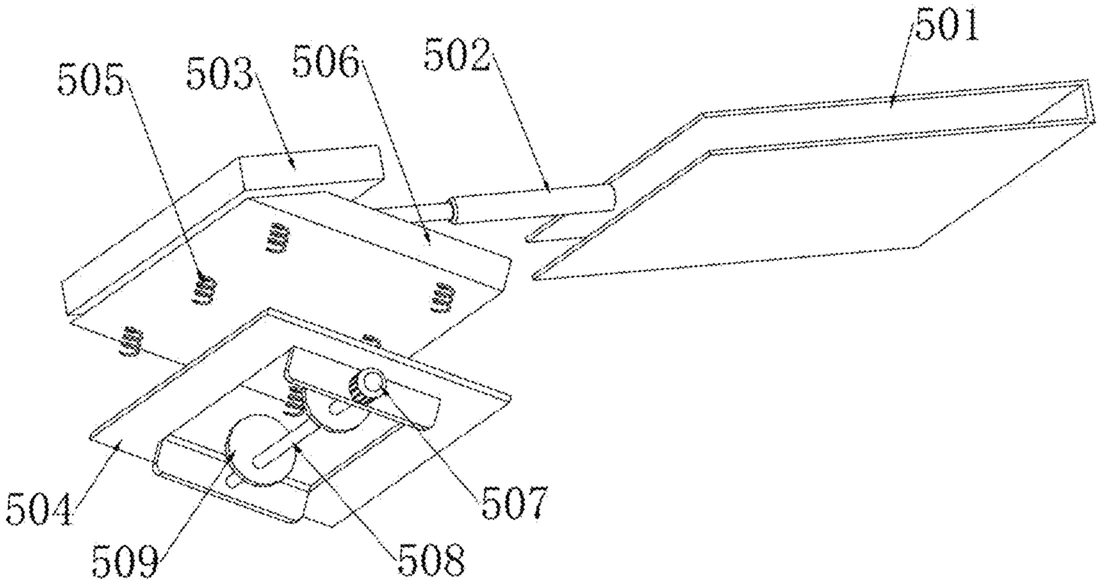
FIG. 5 is a structural schematic diagram of a discharging assembly of the organic solid waste treatment equipment according to the present disclosure.

As shown in FIGS. 3-5, the fixing frame 504 is located at the lower side of the bracket 501, the inner surface of the bracket 501 is fixedly connected with an electric push rod 502, the end surface of the electric push rod 502 is fixedly connected with a baffle plate 503. The electric push rod 502 is in an extended state, and the outer surfaces of the bracket 501 and the baffle plate 503 are attached to the inner surface of the box body 1. When the electric push rod 502 is in an extended state, the bracket 501 and the baffle plate 503 form a complete shield inside the box body 1. After the waste is squeezed and drained, the electric push rod 502 is started to contract to drive the baffle plate 503 to move away. After the baffle plate 503 is moved away, a gap appears in the position of the bracket 501, and the squeezed waste falls out from the gap position removed by the baffle plate 503.

As shown in FIG. 5, the top of the fixing frame 504 is uniformly and fixedly connected with a plurality of second springs 505, and a discharging guide plate 506 is fixedly connected between the upper end faces of the plurality of second springs 505. The discharging guide plate 506 is matched with the position of the baffle plate 503, the waste falling from the gap falls to the position of the discharging guide plate 506, and the waste slides down the inclined plane of the discharging guide plate 506 for discharging.

As shown in FIG. 5, the outer surface of the fixing frame 504 is fixedly connected with a first motor 507, the output end of the first motor 507 slides through the fixing frame 504 and extends to the inner side, the output end of the first motor 507 is fixedly connected with a first rotating shaft 508, the outer surface of the first rotating shaft 508 is symmetrically and fixedly connected with an eccentric wheel 509, and the outer surface of the eccentric wheel 509 is attached to the bottom of the discharging guide plate 506. When the waste is discharged through the discharging guide plate 506, the first motor 507 is started to drive the eccentric wheel 509 to rotate through the connection of the first rotating shaft 508. The eccentric wheel 509 rotates and repeatedly hits the bottom of the discharging guide plate 506, so that the discharging guide plate 506 generates continuous vibration. The vibrations of the discharging guide plate 506 are used to disperse the compacted waste into smaller pieces, facilitating the crushing process of the waste, preventing large pieces of waste from jamming or damaging the blades 608.

Figure 6:
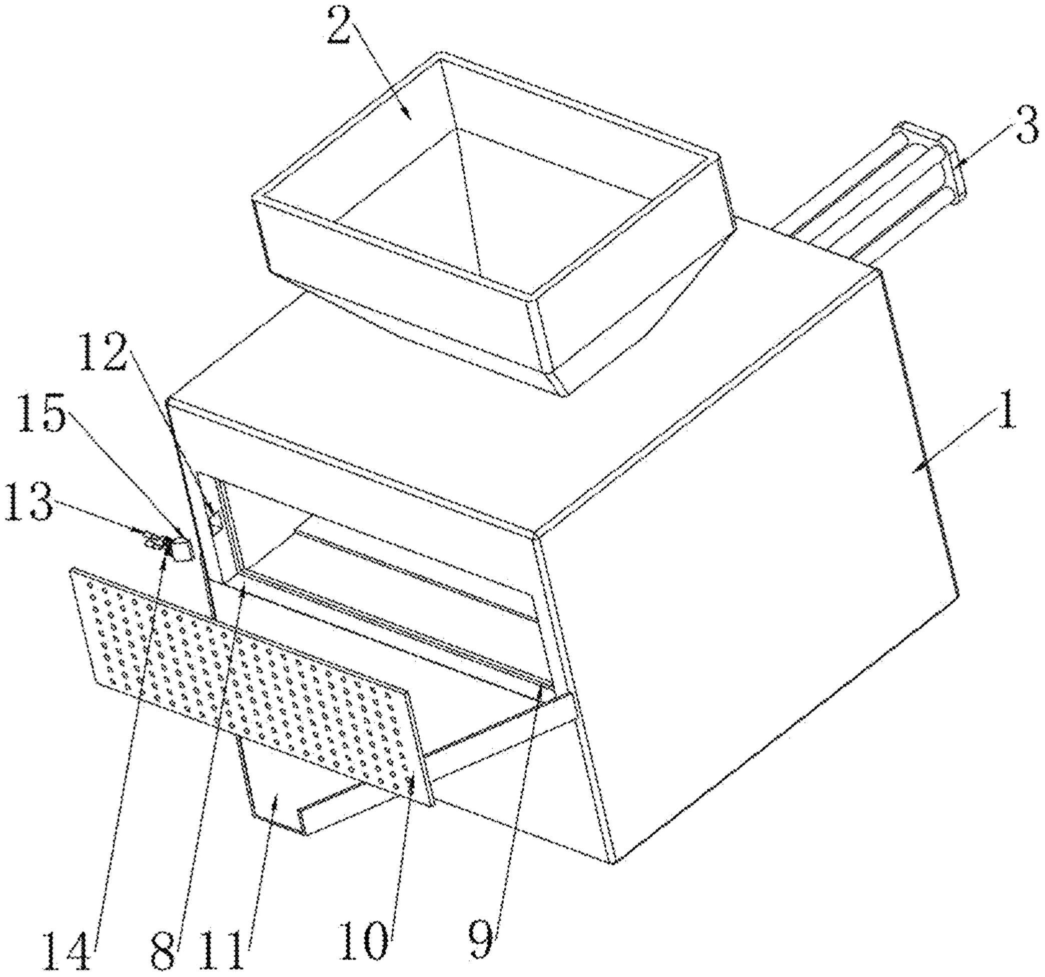
FIG. 6 is a mounting structural schematic diagram of a filter screen of the organic solid waste treatment equipment according to the present disclosure.

As shown in FIG. 6, the inner surfaces of both sides of the drainage groove 8 are provided with mounting grooves 12, the inner bottoms of the mounting grooves 12 are symmetrically and fixedly connected with second telescopic rods 13, the outer surface of the second telescopic rods 13 is sleeved with a third spring 14, a clamping block 15 is fixedly connected between the end surfaces of two second telescopic rods 13, the outer surface of the filter screen 10 is attached to the inner surface of the drainage groove 8, the filter screen 10 is located between the clamping frame 9 and the clamping block 15, the outer surface of the clamping block 15 is arranged in an inclined plane, and a drainage guide plate 11 is fixedly connected to the outer surface of the box body 1 near the lower side of the drainage groove 8. When the waste is accumulated in the position of the filter screen 10, the squeezed water flows out along the drainage guide plate 11. When the filter screen 10 needs to be cleaned, the clamping block 15 on the inside of the mounting grooves 12 is pressed, allowing the filter screen 10 to be directly removed once the clamping block 15 is moved. After the cleaning is completed, the filter screen 10 is pressed directly into the drainage groove 8. After the filter screen 10 comes into contact with the inclined surface of the clamping block 15, the clamping block 15 is pressed into the mounting grooves 12. Then, the resilience of the third spring 14 is utilized to drive the clamping block 15 to pop out, the filter screen 10 is clamped between the clamping frame 9 and the clamping block 15, and the installation is completed. This makes the operation of installing and uninstalling the filter screen 10 relatively convenient and quick.

Figure 7:
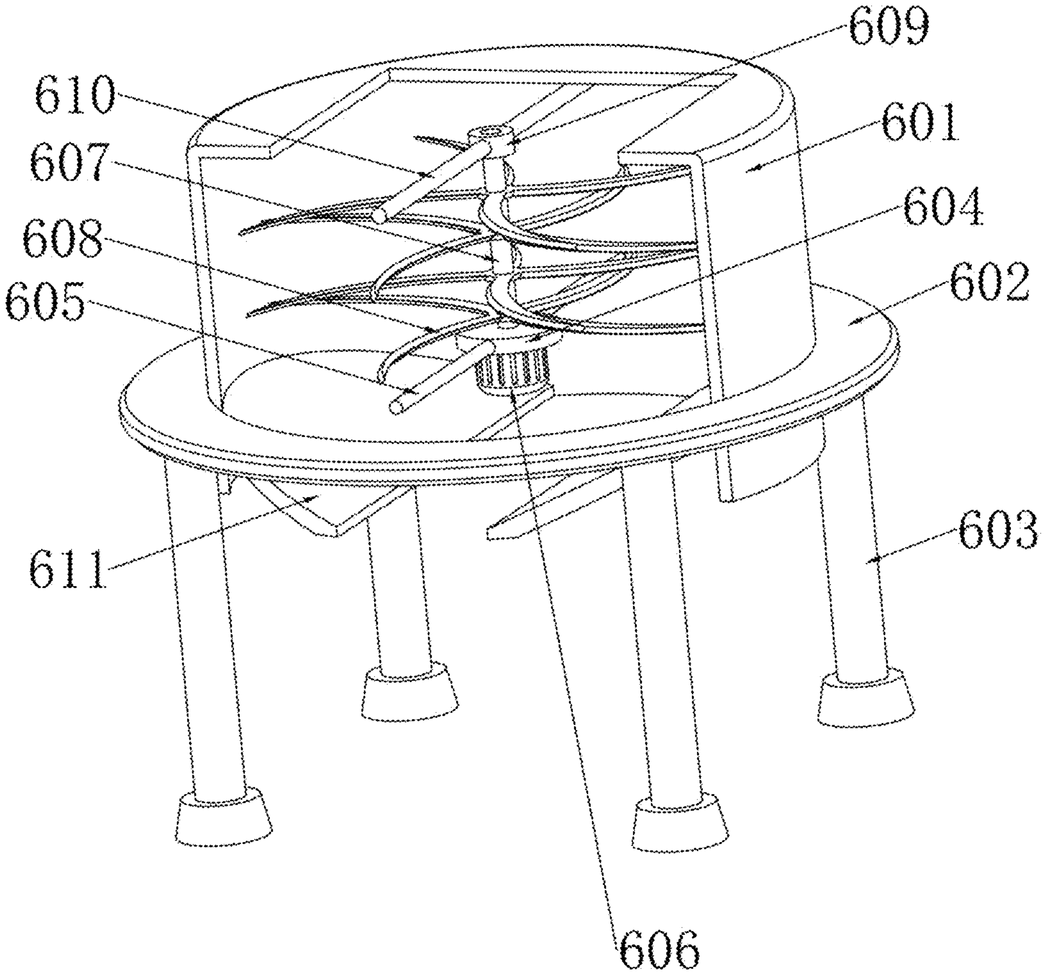
FIG. 7 is a structural schematic diagram of a crushing assembly of the organic solid waste treatment equipment according to the present disclosure.

As shown in FIG. 7, the inner surface of the crushing barrel 601 is symmetrically and fixedly connected with first fixing rods 605 near the lower end surface, a mounting plate 604 is fixedly connected between the end surfaces of two first fixing rods 605, the bottom of the mounting plates 604 is fixedly connected with a second motor 606, the output end of the second motor 606 slides through the mounting plates 604 and extends to the upper side, and the output end of the second motor 606 is fixedly connected with a second rotating shaft 607, and the outer surface of the second rotating shaft 607 is uniformly and fixedly connected with a plurality of blades 608; the waste conveyed by the discharging guide plate 506 falls into the crushing barrel 601, and the second motor 606 is started, the blades 608 are driven to rotate through the connection of the second rotating shaft 607, and the falling waste is crushed through the rotation of the blades 608.

As shown in FIG. 7, the inner surface of the crushing barrel 601 is symmetrically and fixedly connected with the second fixing rods 610 near the upper end surface, a bearing 609 is fixedly connected between the end surfaces of two second fixing rods 610. The inner surface of the bearing 609 is rotatably connected with the outer surface of the second rotating shaft 607, and the inner surface of the crushing barrel 601 is symmetrically and fixedly connected with inclined plates 611 near the lower side of the mounting plate 604. When the second rotating shaft 607 rotates, the second fixing rods 610 and the bearing 609 are matched to support the second rotating shaft 607, improving the rotation stability of the second rotating shaft 607, and the broken waste slides down the inclined plates 611 into the receiving hopper 702.

Figure 8:
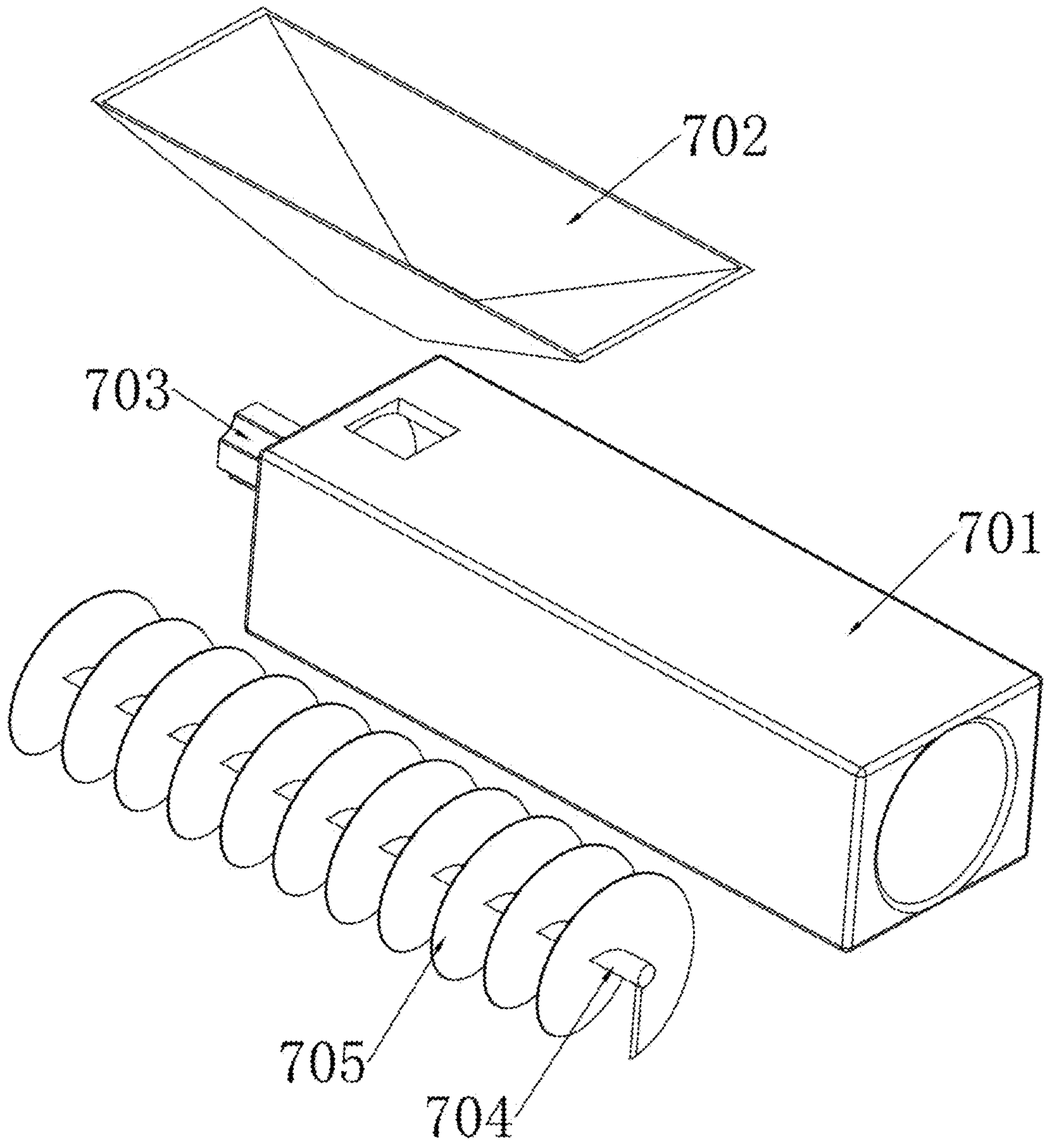
FIG. 8 is a structural schematic diagram of a feeding assembly of the organic solid waste treatment equipment according to the present disclosure.

As shown in FIG. 7 and FIG. 8, the inclined plates 611 are matched with the receiving hopper 702, the outer surface of the conveying pipe 701 is fixedly connected with a third motor 703, the output end of the third motor 703 slides through the conveying pipe 701 and extends to the inner side, the output end of the third motor 703 is fixedly connected with a third rotating shaft 704, the outer surface of the third rotating shaft 704 is fixedly connected with auger flights 705, and the outer surface of the auger flights 705 is attached to the inner surface of the conveying pipe 701. The waste slides into the conveying pipe 701 along the receiving hopper 702, the third motor 703 is started, the auger flights 705 are driven to rotate through the connection of the third rotating shaft 704, and the waste is sent out from the end face of the conveying pipe 701 through the rotation of the auger flights 705, thus completing the discharging.

In the disclosure, when organic solid waste is treated, the waste is poured into the box body 1 from the position of the feeding port 2, and the waste is accumulated on the upper position of the bracket 501 and the baffle plate 503; the hydraulic rod 3 is extended to drive the squeezing plate 401 to move, and the waste is pushed towards the drainage groove 8; when the waste is pushed to the surface of the filter screen 10 by the squeezing plate 401, the waste is squeezed and drained by the pressure exerted by the squeezing plate 401; the squeezed water flows out along the drainage guide plate 11, the resiliency provided by the first telescopic rods and the first springs drives the insert block 405 and the scraper 406 to closely adhere to the surface of the bracket 501. The scraper 406 can remove contaminants adhering to the surface of the bracket 501, preventing waste from sticking to the interior of the box body 1 and causing pollution; the expansion and contraction of the hydraulic rod 3 drives the squeezing plate 401 to move to squeeze the waste repeatedly, and the water in the waste is squeezed dry, and the electric squeezing plate 401 of the hydraulic rod 3 is reset after the squeezing is completed; the electric push rod 502 is started to contract to drive the baffle plate 503 to move away. After the baffle plate 503 is moved away, a gap appears in the position of the bracket 501, and the squeezed waste falls out from the gap position removed by the baffle plate 503, the waste falling from the gap falls to the position of the discharging guide plate 506, the first motor 507 is started to drive the eccentric wheel 509 to rotate, the eccentric wheel 509 rotates and repeatedly hits the bottom of the discharging guide plate 506, so that the discharging guide plate 506 generates continuous vibration. The vibrations of the discharging guide plate 506 are used to disperse the compacted waste into smaller pieces, facilitating the crushing process of the waste, preventing large pieces of waste from jamming or damaging the blades 608; the waste conveyed by the discharging guide plate 506 falls into the crushing barrel 601, and the second motor 606 is started, the blades 608 are driven to rotate, and the falling waste is crushed through the rotation of the blades 608; the crushed waste slides into the conveying pipe 701 along the inclined plate 611 and the receiving hopper 702, the third motor 703 is started, the auger flights 705 are driven to rotate, and the waste is sent out from the end face of the conveying pipe 701 through the rotation of the auger flights 705, thus completing the discharging.

The wiring diagrams of the hydraulic rod 3, the electric push rod 502, the first motor 507, the second motor 606 and the third motor 703 in the present disclosure belong to the common sense in the field, and their working principles are well-known technologies, and their models are selected according to actual use, so the control mode and wiring arrangement of the hydraulic rod 3, the electric push rod 502, the first motor 507, the second motor 606 and the third motor 703 are explained in detail.

Although the present disclosure has been described in detail with reference to the foregoing embodiments, it is still possible for a person skilled in the art to modify the technical scheme described in the foregoing embodiments or to replace some technical features by equivalents. Any modification, equivalent replacement, improvement, etc. made within the spirit and principle of the present disclosure should be included in the protection scope of the present disclosure.

What is claimed is:

1. Organic solid waste treatment equipment, comprising, a box body (1), wherein a top of the box body (1) is fixedly connected with a feeding port (2), an outer surface of one side of the box body (1) is fixedly connected with a hydraulic rod (3), an output end of the hydraulic rod (3) slides through the box body (1) and extends to an inside of the box body (1), an outer surface of another side of the box body (1) is provided with a drainage groove (8), an inner surface of the drainage groove (8) is fixedly connected with a clamping frame (9), and an outer surface of the clamping frame (9) is provided with a filter screen (10);

a squeezing assembly (4), wherein the squeezing assembly (4) is fixedly connected with the output end of the hydraulic rod (3), and comprises a squeezing plate (401);

a discharging assembly (5), wherein the discharging assembly (5) is fixedly connected to an inner surface of the box body (1), and comprises a bracket (501) and a fixing frame (504);

a crushing assembly (6), wherein the crushing assembly (6) is fixedly connected to a bottom of the box body (1), and comprises a crushing barrel (601), an outer surface of the crushing barrel (601) is fixedly connected with a support ring (602), and a bottom of the support ring (602) is uniformly and fixedly connected with a plurality of support legs (603); and a feeding assembly (7), wherein the feeding assembly (7) is fixedly connected to a bottom of the crushing barrel (601), and comprises a receiving hopper (702), and a conveying pipe (701) is fixedly connected at a bottom of the receiving hopper (702);

wherein the squeezing plate (401) is matched with the drainage groove (8), a bottom of the squeezing plate (401) is provided with a notch (402), an inner bottom of the notch (402) is fixedly connected with a plurality of first telescopic rods (403) at equal intervals, outer surfaces of the plurality of first telescopic rods (403) are sleeved with first springs (404), bottoms of the plurality of first telescopic rods (403) are fixedly connected with an insert block (405), a bottom of the insert block (405) is fixedly connected with a scraper (406), a bottom of the scraper (406) is positioned against a top of the bracket (501), and an outer surface of the insert block (405) is slidably connected with an inner surface of the notch (402);

wherein the fixing frame (504) is located at a lower side of the bracket (501), an inner surface of the bracket (501) is fixedly connected with an electric push rod (502), and an end surface of the electric push rod (502) is fixedly connected with a baffle plate (503); and when the electric push rod (502) is in an extended state, outer surfaces of the bracket (501) and the baffle plate (503) are positioned against the inner surface of the box body (1);

wherein a top of the fixing frame (504) is uniformly and fixedly connected with a plurality of second springs (505), and a discharging guide plate (506) is fixedly connected to upper end faces of the plurality of second springs (505); and the discharging guide plate (506) is matched with a position of the baffle plate (503);

wherein an outer surface of the fixing frame (504) is fixedly connected with a first motor (507), an output end of the first motor (507) passes through the fixing frame (504) and extends to an inner side of the fixing frame (504), the output end of the first motor (507) is fixedly connected with a first rotating shaft (508), an outer surface of the first rotating shaft (508) is symmetrically and fixedly connected with eccentric wheels (509), and an outer surface of each of the eccentric wheels (509) is positioned against a bottom of the discharging guide plate (506);

wherein inner surfaces of left and right sides of the drainage groove (8) are provided with mounting grooves (12), an inner bottom of each of the mounting grooves (12) is symmetrically and fixedly connected with two second telescopic rods (13), an outer surface of each of the two second telescopic rods (13) is sleeved with a third spring (14), a clamping block (15) is fixedly connected between end surfaces of the two second telescopic rods (13), an outer surface of the filter screen (10) is attached to the inner surface of the drainage groove (8), the filter screen (10) is located between the clamping frame (9) and the clamping block (15), an outer surface of the clamping block (15) is arranged in an inclined plane, and a drainage guide plate (11) is fixedly connected to the outer surface of the another side of the box body (1) near a lower side of the drainage groove (8);

wherein an inner surface of the crushing barrel (601) is symmetrically and fixedly connected with two first fixing rods (605) near a lower end surface of the crushing barrel (601), a mounting plate (604) is fixedly connected between end surfaces of the two first fixing rods (605), a bottom of the mounting plate (604) is fixedly connected with a second motor (606), an output end of the second motor (606) passes through the mounting plate (604) and extends to an upper side of the mounting plate (604), the output end of the second motor (606) is fixedly connected with a second rotating shaft (607), and an outer surface of the second rotating shaft (607) is uniformly and fixedly connected with a plurality of blades (608);

wherein the inner surface of the crushing barrel (601) is symmetrically and fixedly connected with two second fixing rods (610) near an upper end surface of the crushing barrel (601), a bearing (609) is fixedly connected between end surfaces of the two second fixing rods (610); an inner surface of the bearing (609) is rotatably connected with the outer surface of the second rotating shaft (607), and the inner surface of the crushing barrel (601) is symmetrically and fixedly connected with inclined plates (611) near a lower side of the mounting plate (604); and wherein the inclined plates (611) are matched with the receiving hopper (702), an outer surface of the conveying pipe (701) is fixedly connected with a third motor (703), an output end of the third motor (703) passes through the conveying pipe (701) and extends to an inner side of the conveying pipe (701), the output end of the third motor (703) is fixedly connected with a third rotating shaft (704), an outer surface of the third rotating shaft (704) is fixedly connected with auger flights (705), and an outer surface of each of the auger flights (705) is positioned within an inner surface of the conveying pipe (701).

2. An application method of the organic solid waste treatment equipment, implemented by the organic solid waste treatment equipment according to claim 1, comprising the following steps:

S1, when processing organic solid waste, pouring the organic solid waste into the box body (1) from the feeding port (2), extending the hydraulic rod (3), driving the squeezing plate (401) to move, and pushing the organic solid waste towards the drainage groove (8); pushing the organic solid waste towards the filter screen (10) by the squeezing plate (401), applying pressure through the squeezing plate (401) to squeeze and drain the organic solid waste, allowing squeezed-out water to flow out along the drainage guide plate (11), and repeatedly squeezing the organic solid waste by moving the squeezing plate (401) through the extension and retraction of the hydraulic rod (3) to dry the organic solid waste, thereby to obtain squeezed waste;

S2, completing the squeezing, retracting the electric push rod (502) to retract the baffle plate (503), creating a gap adjacent the bracket (501) after the baffle plate (503) is retracted, allowing the squeezed waste to fall out from the gap, dropping the squeezed waste from the gap onto the discharging guide plate (506), and sliding the squeezed waste down an inclined surface of the discharging guide plate (506) for discharging;

S3, when the squeezed waste is discharged across the discharging guide plate (506), initiating the first motor (507) to drive the eccentric wheels (509) into rotation, rotating the eccentric wheels (509) to repeatedly strike the bottom of the discharging guide plate (506), causing the discharging guide plate (506) to generate continuous vibrations, and using the continuous vibrations of the discharging guide plate (506) to disperse the squeezed waste to thereby obtain dispersed waste for facilitating a crushing process of the squeezed waste; and S4, passing the dispersed waste across the discharging guide plate (506) and making the dispersed waste fall into the crushing barrel (601), activating the second motor (606) to drive the plurality of blades (608) to rotate, rotating the plurality of blades (608) to crush the dispersed waste in the crushing barrel (601) to obtain crushed waste, allowing the crushed waste to slide down the inclined plates (611) and into the receiving hopper (702), then into the conveying pipe (701); and activating the third motor (703) to drive the auger flights (705) to rotate, rotating the auger flights (705) to push the crushed waste out from an end face of the conveying pipe (701), and completing the discharging.

* * * * *